United States Patent
Kirby et al.

(10) Patent No.: US 9,212,079 B2
(45) Date of Patent: Dec. 15, 2015

(54) METHODS AND APPARATUS FOR REDUCING STRESS VARIATIONS IN GLASS SHEETS PRODUCED FROM A GLASS RIBBON

(75) Inventors: Thomas Edward Kirby, Pineville, LA (US); Liam Ruan de Paor, Hampstead, NC (US)

(73) Assignee: Corning Incorporated, Corning, NY (US)

( * ) Notice: Subject to any disclaimer, the term of this patent is extended or adjusted under 35 U.S.C. 154(b) by 1807 days.

(21) Appl. No.: 12/306,095

(22) PCT Filed: Jun. 27, 2007

(86) PCT No.: PCT/US2007/014865
§ 371 (c)(1),
(2), (4) Date: Aug. 18, 2009

(87) PCT Pub. No.: WO2008/005250
PCT Pub. Date: Jan. 10, 2008

(65) Prior Publication Data
US 2010/0043495 A1    Feb. 25, 2010

Related U.S. Application Data

(60) Provisional application No. 60/817,720, filed on Jun. 30, 2006.

(51) Int. Cl.
C03B 17/06    (2006.01)
C03B 33/02    (2006.01)

(52) U.S. Cl.
CPC ............. *C03B 33/0215* (2013.01); *C03B 17/06* (2013.01); *B65G 2249/04* (2013.01)

(58) Field of Classification Search
CPC ............................ C03B 33/0215; C03B 17/06
USPC ...................... 65/25.3, 90, 91, 92, 97, 199, 98
See application file for complete search history.

(56) References Cited

U.S. PATENT DOCUMENTS 1,402,145 A    1/1922    Callard
1,469,379 A    10/1923   Callard
(Continued)

FOREIGN PATENT DOCUMENTS

JP    45646       1/1970
JP    05124826    5/1993    .............. C03B 17/06
(Continued)

OTHER PUBLICATIONS

Chinese application No. 201210211384.2, dated May 8 2014, "Notice on the First Office Action", pp. 1-16.

*Primary Examiner* — Richard Crispino
*Assistant Examiner* — Yana Belyaev
(74) *Attorney, Agent, or Firm* — Matthew J. Mason (57) ABSTRACT

In a vertical glass drawing process, an edge guiding assembly (33) located between a glass forming apparatus (41) and a glass sheet separating apparatus (20) reduces horizontal motion of the glass ribbon (13) from which the glass sheets (11) are removed and results in the reduction of the difference in stress levels between the top and bottom edges of a glass sheet (11) made by the process. The edge guiding assembly also provides a reduction of the variation of stress levels between successive sheets of glass made by the vertical drawing process.

10 Claims, 7 Drawing Sheets

(56) References Cited

U.S. PATENT DOCUMENTS

| | | | |
|---|---|---|---|
| 1,586,618 A | 6/1926 | Ferngren | |
| 3,338,696 A | 8/1967 | Dockerty | 65/145 |
| 3,682,609 A | 8/1972 | Dockerty | 65/83 |
| 3,773,486 A | 11/1973 | Toussaint et al. | 65/29 |
| 3,926,605 A * | 12/1975 | Kunkle | 65/91 |
| 4,612,030 A | 9/1986 | Smids | 65/91 |
| 6,616,025 B1 | 9/2003 | Andrewlavage, Jr. | 225/96.5 |
| 6,758,064 B1 * | 7/2004 | Kariya | 65/91 |
| 2005/0138966 A1 * | 6/2005 | Pitbladdo | 65/29.21 |
| 2005/0268655 A1 | 12/2005 | Butts et al. | 65/29.12 |
| 2006/0042314 A1 * | 3/2006 | Abbott et al. | 65/25.3 |
| 2007/0095108 A1 * | 5/2007 | Kirby et al. | 65/475 |

FOREIGN PATENT DOCUMENTS

| | | | |
|---|---|---|---|
| JP | 05124827 | 5/1993 | C03B 17/06 |
| JP | 10291826 | 11/1998 | C03B 17/06 |
| JP | 2007-051028 | 3/2007 | C03B 17/06 |
| WO | 2005073137 A1 | 8/2005 | |

* cited by examiner

METHODS AND APPARATUS FOR REDUCING STRESS VARIATIONS IN GLASS SHEETS PRODUCED FROM A GLASS RIBBON

I. FIELD OF THE INVENTION

This invention relates to the manufacture of glass sheets such as the glass sheets used as substrates in display devices such as liquid crystal displays (LCDs). More particularly, the invention relates to methods for reducing the amount of distortion which glass substrates exhibit when cut into parts during, for example, the manufacture of such displays.

II. BACKGROUND OF THE INVENTION

Display devices are used in a variety of applications. For example, thin film transistor liquid crystal displays (TFT-LCDs) are used in notebook computers, flat panel desktop monitors, LCD televisions, and Internet and communication devices, to name only a few.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate or a sub-piece of a substrate. At various points in such processes, the substrate is divided into parts along cut lines.

Such cutting changes the stress distribution within the glass, specifically, the in plane stress distribution seen when the glass is vacuumed flat. Even more particularly, the cutting relieves stresses at the cut line such that the cut edge is rendered traction free. Such stress relief in general results in changes in the vacuumed-flat shape of the glass sub-pieces, a phenomenon referred to by display manufacturers as "distortion." Although the amount of shape change is typically quite small, in view of the pixel structures used in modern displays, the distortion resulting from cutting can be large enough to lead to substantial numbers of defective (rejected) displays. Accordingly, the distortion problem is of substantial concern to display manufacturers and specifications regarding allowable distortion as a result of cutting can be as low as 2 microns or less.

The present invention is directed to controlling distortion and, in particular, to methods for controlling distortion in sub-pieces cut from glass sheets produced by a vertical drawing process, such as, e.g., a downdraw process, an overflow downdraw process (also known as a fusion process), an updraw process, or the like.

III. SUMMARY OF THE INVENTION

In accordance with a first aspect, the invention provides a method for producing sheets of glass (11) using a vertical drawing process, said method comprising:

(a) forming a glass ribbon (13) using a forming assembly (41), said ribbon (13) having a central region (51) and two edge regions (53),(55), each of which having a first side and a second side;

(b) successively removing sheets of glass (11) from the ribbon (13) using a separating assembly (20) which forms a separation line (47) across the width of the ribbon (13), said separating assembly (20) being located below said forming assembly (41); and (c) guiding both the first and second sides of each of the ribbon's edge regions (53),(55) into a vertical plane with an edge-guiding assembly (33), said edge-guiding assembly (33) being located above the separating assembly (20).

In certain embodiments of the invention, step (c) reduces movement in a horizontal direction of at least a portion of the ribbon's central region (51), said portion being located between the forming assembly (41) and the separating assembly (20). In accordance with these embodiments, the temperature of the glass at said portion can be within the glass' glass transition temperature range. Although not wishing to be bound by any particular theory of operation, it is believed that in this way, variations in the stress levels of glass sheets (11) cut from the ribbon (13) are reduced at at least one location, e.g., along at least one edge of the glass sheet (11).

In accordance with a second aspect, the invention provides an assembly for guiding an edge region (53) or (55) of a glass ribbon (13) into a vertical plane comprising:

(a) a rail (49);

(b) a first set of vertically-spaced wheels (35) mounted on a support (63),(67) each of said wheels having a glass engaging surface (71); and (c) a second set of vertically-spaced wheels (35) mounted on a support (65),(69) each of said wheels (35) having a glass engaging surface (71); and wherein the supports (63), (65) are slidably mounted on rail (49) such that the wheels (35) may be moved into contact with the glass ribbon (13) or brought out of contact with glass ribbon (13).

For ease of presentation, the present invention is described and claimed in terms of the production of glass sheets. It is to be understood that throughout the specification and claims, the word "glass" is intended to cover both glass and glass ceramic materials.

Also, the phrase "temperature of the glass" means the surface temperature of the glass ribbon at its centerline. Such temperatures can be measured by various techniques known in the art, such as with pyrometers and/or contact thermocouples.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. The drawings are not to scale. It is to be understood that the various features of the invention disclosed in this specification and in the drawings can be used in any and all combinations.

IV. BRIEF DESCRIPTION OF THE DRAWINGS

FIGS. 3A and 3B are top views of a guidance device constructed in accordance with the invention. FIG. 3A shows the guidance device in its open position, and FIG. 3B shows the guidance device in its closed position.

FIGS. 4A and 4B show a front view of a guidance device constructed in accordance with the invention. FIG. 4A shows the guidance device in its open position and FIG. 4B shows the guidance device in its closed position.

V. DETAILED DESCRIPTION OF THE INVENTION AND ITS PREFERRED EMBODIMENTS

Figure 1:
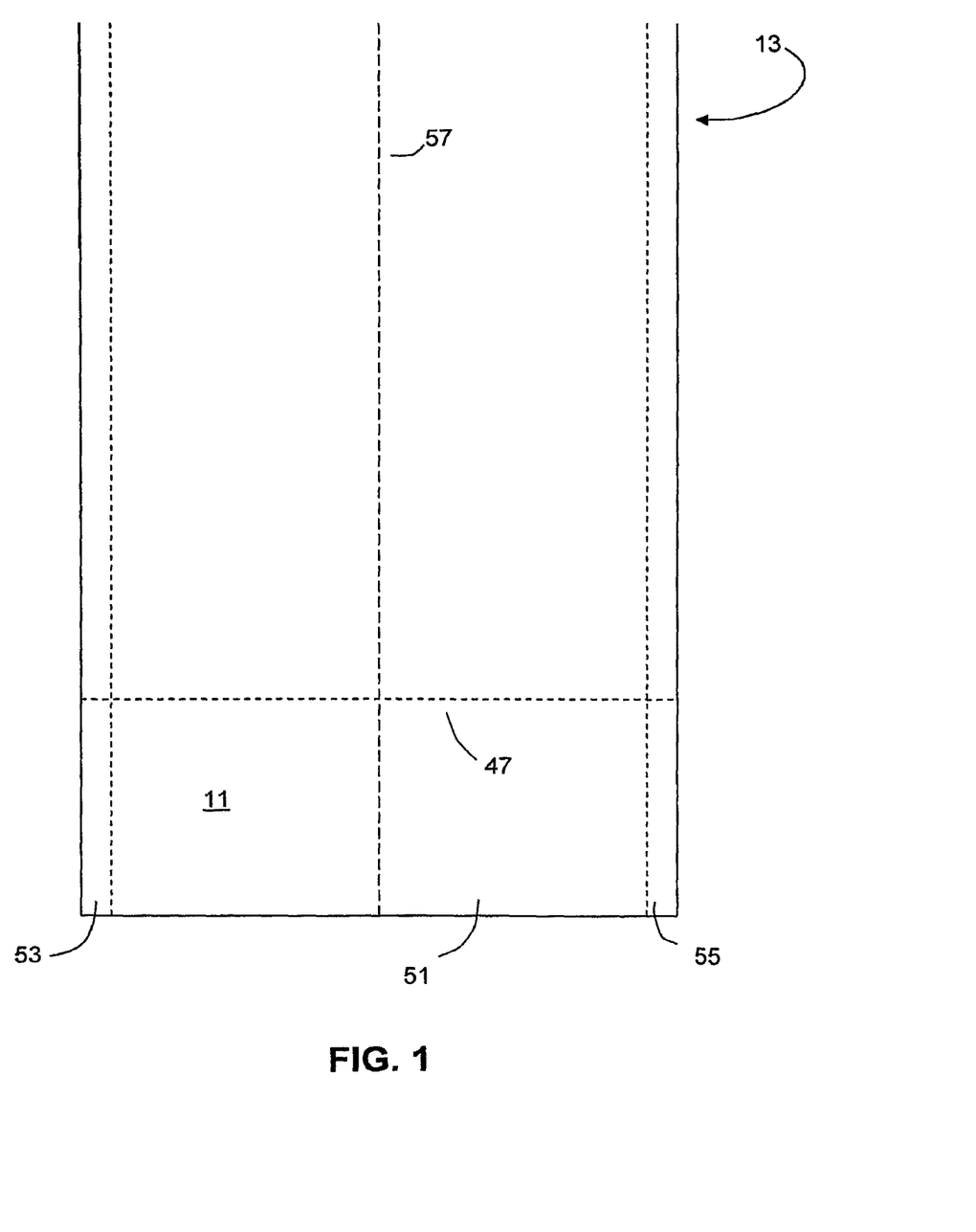
FIG. 1 is a schematic diagram illustrating a glass ribbon formed by a drawing process from which individual sheets of glass are cut. The locations of the edge regions of the ribbon relative to its centerline and central region are illustrated in this figure.

FIG. 1 shows a representative glass ribbon (13) which comprises a central region (51) (the quality portion of the ribbon) and two edge regions (53),(55) (the non-quality or "bead" portions of the ribbon), which typically will contain a knurled pattern as a result of contact of these regions with one or more edge or pulling rollers. Also shown in this figure are the ribbon's centerline (57) and separation line (47) at which an individual glass sheet (11) is removed from the ribbon.

Figure 2A:
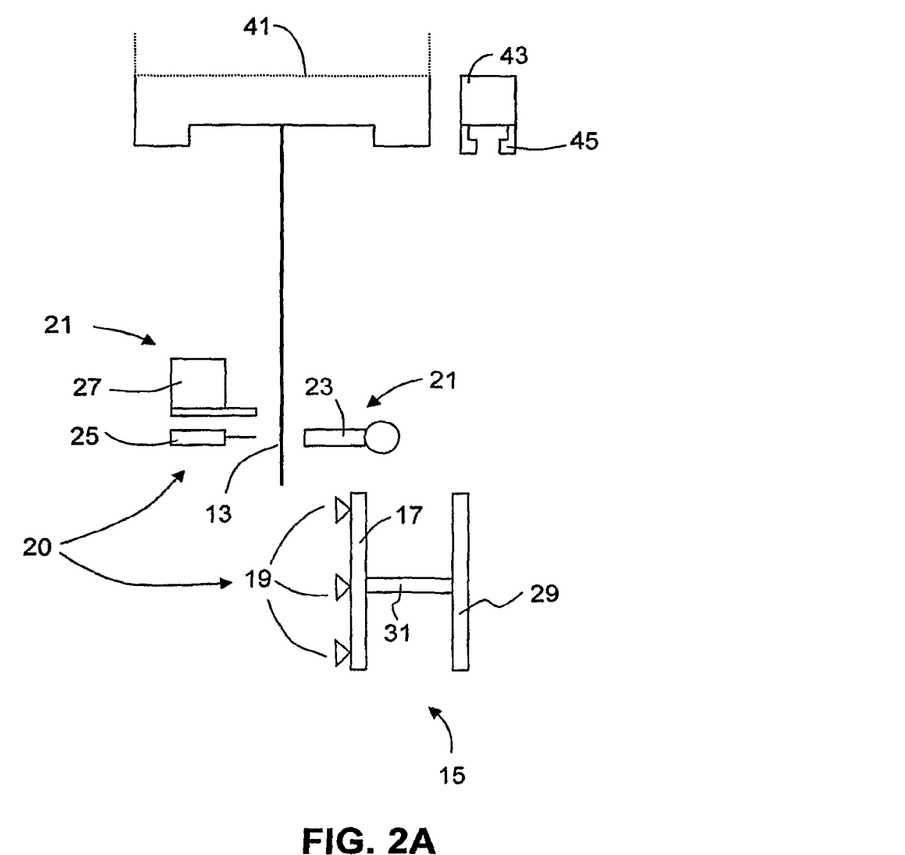
FIGS. 2A, 2B, and 2C illustrate the separation of a sheet of glass from a moving ribbon of glass.
Figure 2B:
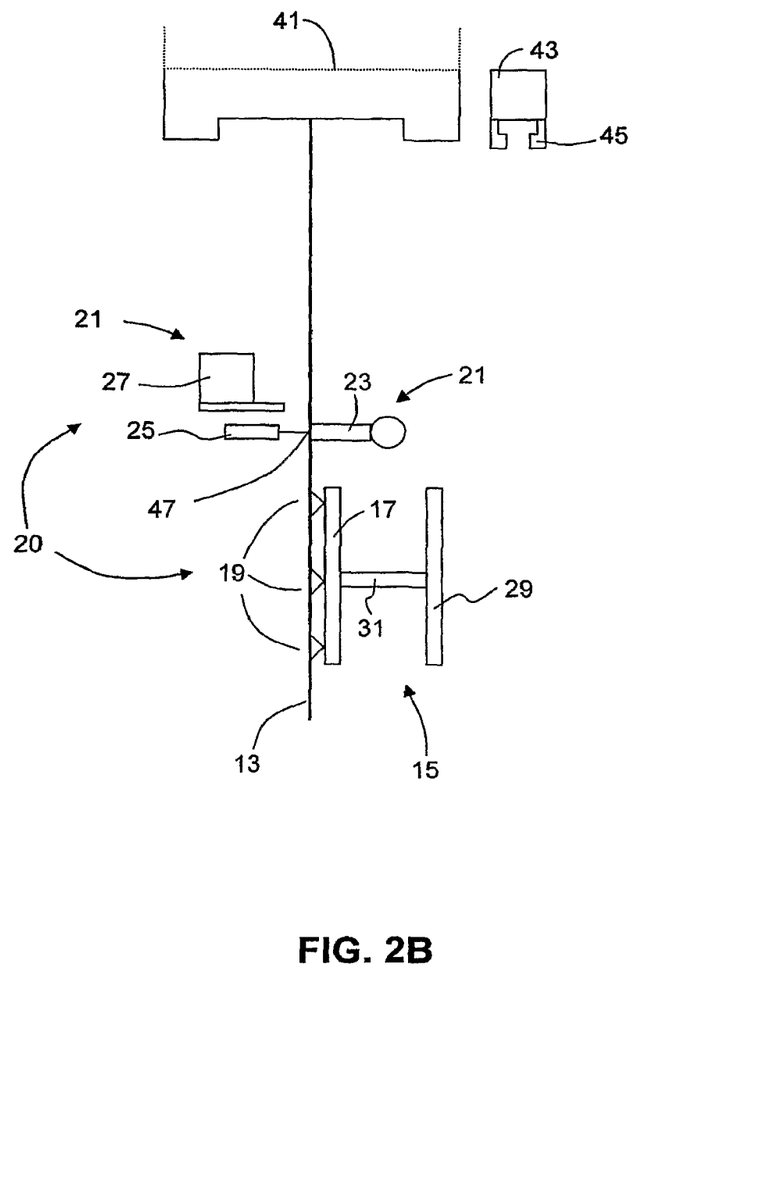
Figure 2C:
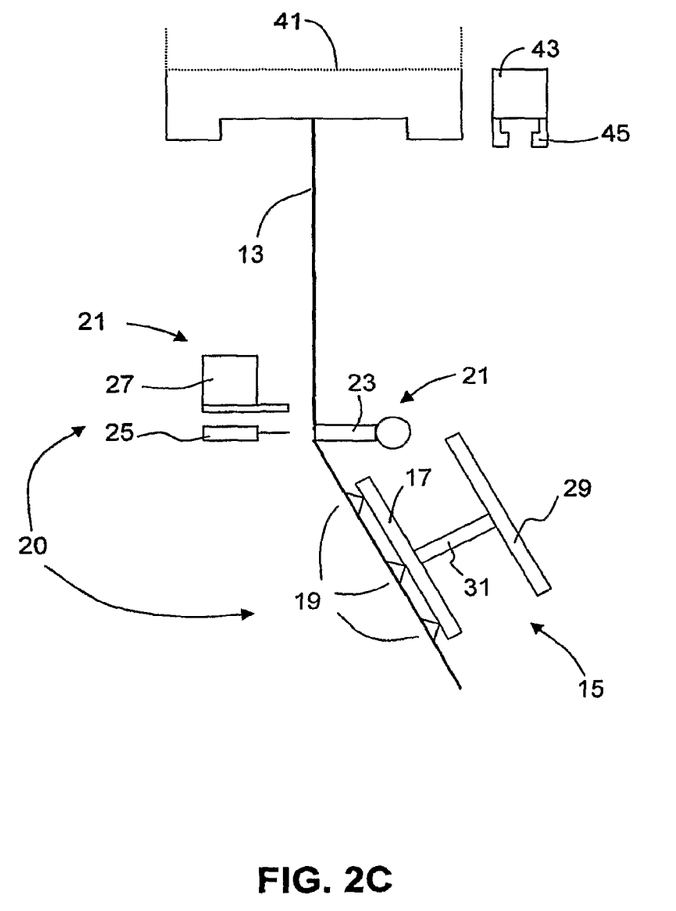

FIGS. 2A, 2B, and 2C show a suitable separating assembly (20) which can be used in accordance with the present invention to remove individual glass sheets (11) from ribbon (13). This assembly is of the type disclosed in commonly-assigned Andrewlavage, Jr., U.S. Pat. No. 6,616,025, the contents of which are incorporated herein by reference. Other equipment having different configurations and functionalities can, of course, be used in the practice of the invention if desired.

In each of FIGS. 2A, 2B, and 2C, the reference number (41) represents a forming assembly which produces glass ribbon (13), e.g., a forming assembly of the overflow downdraw type for producing LCD glass. As forming assemblies of this type are known in the art, details are omitted so as not to obscure the description of the present invention. Other types of glass forming apparatus (e.g., slot draw assemblies) can, of course, be used in conjunction with the invention. As with overflow systems, such apparatus is within the purview of the artisan of ordinary skill in glass manufacture.

Reference number (43) in FIGS. 2A, 2B, and 2C represents a sheet transport system which includes sheet grippers (45) for moving a separated sheet to further stages of the manufacturing process, e.g., to an edging station, an inspection station, etc. Again, because apparatus of this type is known in the art, details are omitted so as not to obscure the description of the invention. Apparatus other than that illustrated can, of course, be used in the practice of the invention.

FIG. 2A shows the overall system at the point where the leading edge of glass ribbon (13) has passed scoring sub-assembly (21) and is entering into the region of sheet removal sub-assembly (15). Scoring sub-assembly (21) can comprise anvil (23), scribe (25), and scribe transporter (27). As is conventional, the scoring assembly can be of the moving scribe/moving anvil type, although other types of scoring systems can be used if desired, e.g., laser based systems.

Sheet removal sub-assembly (15) can include frame (17) which carries sheet engaging members (19), e.g., four pane engaging members deployed at the four corners of a rectangle whose dimensions are smaller than the width and length of sheet (11). The pane engaging members (19) can, for example, be soft vacuum suction cups, although other apparatus for engaging a sheet of glass, e.g., clamps, can be used if desired. More or fewer than four pane engaging members can be used as desired.

Sheet removal sub-assembly (15) can include a transporter (29) which is connected to frame (17) through connector assembly (31). Transporter (29) can be an industrial robot and/or fixed automation for providing linear and rotational motion to the frame and connector assembly. Preferably, connector assembly (31) allows frame (17) and an attached glass sheet to undergo a controlled "fall" relative to the transporter once separation of the sheet from the ribbon has occurred at separation line (47).

FIG. 2B shows the formation of separation line (47) in glass ribbon (13) by scribe (25). As also shown in this figure, pane engaging members (19) have engaged the sheet. This engagement can take place either before or after the sheet has been scored. The engagement can be achieved by using a hard placement of the pane engaging members with respect to the sheet in combination with the use of sufficiently soft engaging members, e.g., soft vacuum suction cups, that will not cause undue motion of the sheet.

If the engagement is done after scoring, the engagement should not create a bending moment about the score line which will cause the pane to prematurely separate from the sheet. That is, the engagement needs to be accomplished while maintaining the plane of the glass. A reduced bending moment during engagement can be achieved by controlling the distance between the uppermost pane engaging member and the score line.

Whether sheet removal sub-assembly (15) is engaged with the pane before or after scoring, the sub-assembly needs to be attached to the pane before the bending moment which separates the pane from the ribbon is applied. As long as the plane of the glass is maintained, ribbon (13) can support substantial weight even when scored. The sheet only loses its strength when the separation line opens up and is driven through the sheet by the application of a bending moment which creates a tension/compression gradient in the glass.

FIG. 2C illustrates the application of the bending moment. As shown in this figure, the bending moment is preferably applied about the first side (unscored side) of the sheet using anvil (23) as a stop about which rotation takes place. In its preferred embodiments, connector assembly (31) immediately moves the trailing edge of the separated sheet away from the leading edge of the continually moving ribbon (13). In this way, edge damage can be minimized.

In practice, it has been found that as ribbon (13) leaves forming assembly (41) and moves towards separating assembly (20), there is a tendency for the glass to curl and not maintain a vertical travel. As the ribbon grows in length, its weight becomes sufficient to draw the glass back to a vertical plane. This movement, which can be of the order of 50 millimeters or more at the level of the bottom of the sheet removal sub-assembly, causes temporal changes in the shape of the ribbon along its length. In particular, the movement can cause changes in the shape of that portion of the ribbon that is passing through the glass' glass transition temperature range (GTTR).

It has been further found that when the robot bends the glass sheet (11) about the anvil, and the glass sheet (11) separates from the glass ribbon (13), there is a tendency for the glass ribbon to displace, and for this displacement to travel up the glass ribbon (13) in the form of a displacement wave. This wave eventually reaches the portion of the ribbon that is passing through the glass' GTTR, causing changes in shape of the ribbon in the GTTR.

In a fusion or other type of glass manufacturing process, as a glass ribbon cools, the glass making up the ribbon experiences intricate structural changes, not only in physical dimensions but also on a molecular level. The change from a supple, approximately 50 millimeter thick liquid form at, for example, the root of an isopipe used in a fusion process, to a stiff glass sheet of approximately a half millimeter of thickness is achieved by carefully controlling the cooling of the ribbon as it moves from the forming assembly to the separating assembly.

A critical portion of the cooling process takes place as the glass passes through its GTTR. In particular, the GTTR plays a critical role in distortion because of the behavior of the glass both within the GTTR and above and below the GTTR. At the higher temperatures which exist above the GTTR, glass behaves basically like a liquid: its response to an applied stress is a strain rate, and any elastic response is essentially undetectable. At the lower temperatures which exist below the GTTR, it behaves like a solid: its response to a stress is a finite strain, and any viscous response is essentially undetectable.

When glass cools from a high temperature and passes through the GTTR, it does not show an abrupt transition from liquid-like to solid-like behavior. Instead, the viscosity of the glass gradually increases, and goes through a viscoelastic regime where both the viscous response and the elastic response are noticeable, and eventually it behaves like a solid. As the glass is going through this process, it can take on a permanent shape which can affect the amount of stress in the glass and thus the amount of distortion exhibited when the glass is cut into sub-pieces in, for example, the manufacture of LCD displays.

It has been found that the changes in the shape of the ribbon resulting from its increasing weight as it grows in length or from the displacement wave that is caused by the separation of glass sheets from the ribbon can result in "frozen in" changes in the shape of the ribbon in the GTTR and thus in variations in the stress levels of glass sheets cut from the ribbon. In particular, because this change in shape (or, equivalently, movement of portions of the ribbon out of the vertical plane) happens during the sheet forming cycle, it results in glass sheets whose tops and bottoms have different shapes and thus different stress values and different variations in those stress values. These deviations in stress values between the edges then impact the distortion values for the sheet when it is cut into sub-pieces.

As the length of the glass sheets employed in the manufacture of such products as LCD displays has increased (e.g., to lengths greater than about 950 mm), the opportunity for out of plane movement of the glass ribbon below the forming assembly has increased. Thinner glass sheets also exhibit increased sheet movement, e.g., glass sheets having a thickness of less than 0.7 mm, such as sheets having a thickness of 0.5 mm, exhibit more out of plane movement. Larger shape changes, in turn, generally increase the level of stress and the level of stress variability of glass sheets cut from the ribbon. Thus, in order to effectively reduce the variability of the stress in the glass, the variability of the shape needs to be controlled.

We have found that the variability in the shape of a glass ribbon in the GTTR during a sheet separation cycle depends, at least in substantial part, upon movement of the glass ribbon at locations between the GTTR and the separation line, i.e., at locations substantially below the GTTR. This movement is transferred up the glass ribbon and becomes locked into the glass in the GTTR.

To reduce the amount of movement of the ribbon in the GTTR, the invention provides mechanical constraints on the movement of the ribbon above the separation line, and in one embodiment, as close to the separation line as is possible without the edge guidance device (33) interfering with the scoring sub-assembly (21). It is in this area that the glass ribbon has the greatest tendency to move out of the vertical plane. The constraints help hold the ribbon in a substantially vertical plane, or other selected orientation, throughout the growth and separation of individual sheets. This constraining action reduces horizontal movement of the sheet before it is cut and removed from the glass ribbon, which, in turn, reduces horizontal movement of the ribbon at locations further above the separation assembly, including horizontal movement of the ribbon in the GTTR. In this way, glass sheets having reduced stress variability levels are achieved. In particular, the stress from sample to sample is more consistent and the stress in the top edge is more similar to that in the bottom edge.

The edge guidance device (33) can be located anywhere below the forming assembly (41) and above the score line (47). The edge guidance device (33) is advantageously located above and as close to the score line (47) as it can be within the physical constraints of the other machinery, including the scribe (25) and scribe transporter (27).

For example, a population of 50 sequential sheets produced with the horizontal motion of the ribbon constrained above the separation line will have a lower standard deviation in stress values in at least one location compared to a population of 50 sequential sheets produced under the same conditions but without such a constraint. Reductions of standard deviation in stress values of about 40% have been observed.

As known in the art, stress levels can be measured at one or more locations on a glass sheet using a birefringence technique. Such measurements will typically be made while the sheet is being vacuumed against a flat surface. Measurements can be made at locations distributed over the entire two-dimensional surface of the sheet or at just a limited number of locations, e.g., along one or more of the sheets edges and/or at predetermined reference locations on the sheet, e.g., at locations near to the lines where the sheet will be divided into sub-pieces.

In order not to compromise glass quality, the constraints of the invention are applied along the edge regions, i.e., non-quality regions, of the ribbon. That is, the constraints are designed to stabilize the glass ribbon without contacting its quality area. Also, in its preferred embodiments, the apparatus used to apply the constraint to the ribbon has a configuration that can be readily integrated above an existing separating assembly.

Figure 3A:
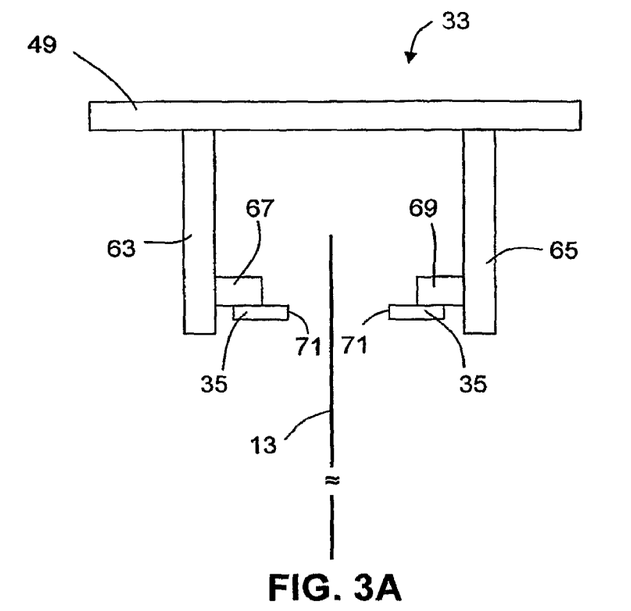
Figure 3B:
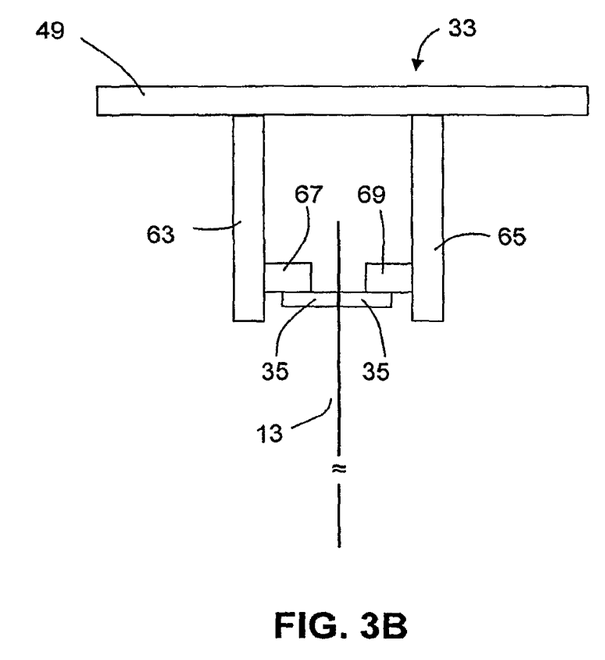
Figure 4A:
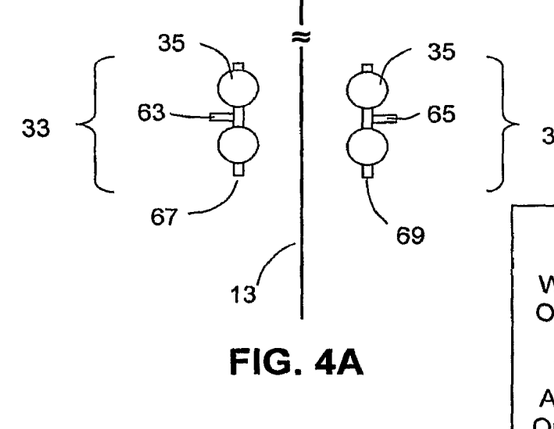
Figure 4B:
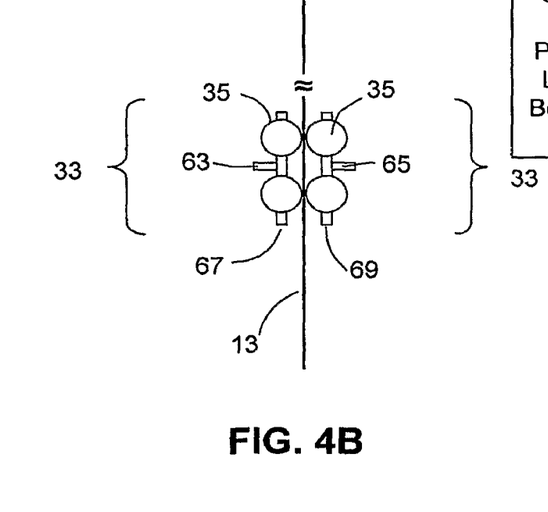
Figure 5:
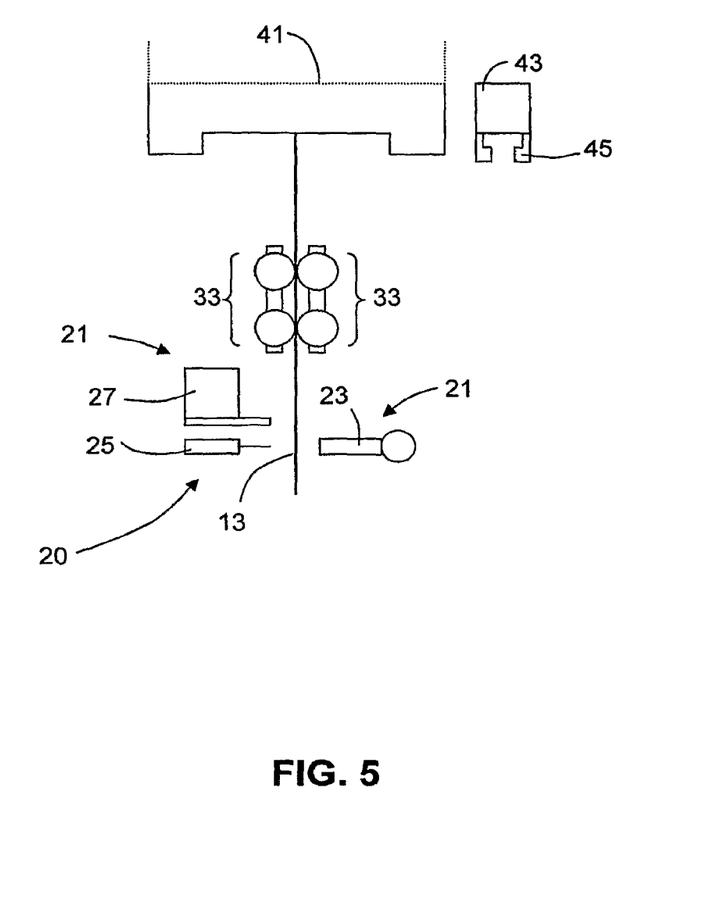
FIG. 5 shows the guidance device of FIGS. 3A, 3B, 4A and 4B installed as part of a glass sheet forming line.

FIGS. 3 and 4 illustrate representative apparatus which can be employed in an edge-guiding assembly of the invention, and FIG. 5 illustrates the integration of this apparatus with a representative forming assembly (41), scoring sub-assembly (21), and sheet removal sub-assembly (15). As can be seen from these figures, this apparatus provides vertical planes of guidance wheels which can be placed on the front and back (first and second) surfaces of the ribbon (13) on both of the ribbon's non-quality edge regions (53) and (55).

More particularly, FIGS. 3A and 3B are top views of the edge-guiding apparatus and FIGS. 4A and 4B are front views. FIGS. 3A and 4A show the apparatus in an open, non-guiding configuration, while FIGS. 3B and 4B show it in an edge-guiding configuration. Transformations between these configurations can be effectuated using conventional motive forces, such as manual screw adjustments electric motors or pneumatic drives.

As shown in these figures, the apparatus can include a body or rail (49) to which arms (63) and (65) are slidably connected. Arms (63) and (65) are, in turn, connected to rails (67) and (69) which carry a plurality of wheels (35) whose glass engaging surfaces (71) are aligned one above the other in a substantially vertical plane. Although two pairs of wheels are shown in FIGS. 4-5, more pairs of wheels can be used in the practice of the invention as desired.

The wheels can be any suitable diameter. For example, the wheels can be between about 1 and about 10 inches in diameter, or about 2 to about 6 inches in diameter, or about 3 to about 4 inches in diameter. On each support rail (67) and (69), the wheels can be installed so that, when new, they are as close to each other as possible without contacting each other. As the wheels wear with use, the space between them will increase. Advantageously, adjacent wheels can have about 1 inch or less clearance between them when new, but they can be spaced farther apart. Any two adjacent wheels (35) should not be so far apart that another wheel (35) could be installed between them with the minimum clearance described above.

The width of the wheels can be any suitable width. For example, the wheels can be between about ¼ inch to about 4 inches wide, or about ½ to about 3 inches wide, or about ¾ inch to about 2 inches wide.

Because the edge-guiding assembly is located above the separating assembly (21), the temperature of the glass at this point of the process is relatively hot. This necessitates the use of any suitable heat resistant materials, now known or yet to be discovered, in the construction of the assembly. Wheels (35) need not be driven to avoid excessive heat build-up, but can simply be allowed to acquire rotational motion through surface contact with the ribbon's edge regions. Driven wheels, however, can be used if desired.

In another embodiment of the invention, rails (67) and (69) are rotatably mounted to arms (63) and (65) through a device such as a ball joint. This provides at least three degrees of motion to the wheels of the edge-guiding assembly and allows the edge guiding assembly to maintain the edges of the glass ribbon (13) in other than purely vertical orientations and to place horizontal tension on the ribbon (13).

In practice, two guidance devices of the type shown in FIGS. 3 and 4 are used, one of which guides edge region (53) and the other of which guides edge region (55) (see FIG. 1). Each guidance device is adjusted in a horizontal plane to match the glass's vertical plane as it extends to the separation line. Preferably, the two devices are designed to be adjusted separately. In this way, the devices can be used with glass ribbons where the two edges of the ribbon are not in the same vertical plane.

The glass engaging surfaces of the device can be moved independently in the horizontal plane so that the distance of those surfaces to the glass can be separately adjusted. In one embodiment the wheels can brought into close proximity to the ribbon, say to within ⅛" of the ribbon. In another embodiment, the glass engaging surfaces (71) rest on or can be adjusted to place pressure on the glass ribbon (13).

In one method, the set of wheels on one side of the ribbon are adjusted to a desired position, either in close proximity or in contact with the glass ribbon. The set of wheels on the other side can then be adjusted to be in close proximity or to contact the glass ribbon in a position such that the glass engaging surfaces of the wheels on one side of the ribbon are opposite the glass engaging surfaces of the wheels on the other side of the ribbon as shown, e.g., in FIGS. 4B and 5.

It should be noted that not only does the ribbon of glass typically exhibit curl, such that the bottom of the ribbon is not located directly below the top of the ribbon, the ribbon can take on many shapes across its width, as well. When, as is typically the case, the ribbon's cross section is not a straight line, the edge regions (53) and (55), when viewed in plan view may not lie along the same line and may not be parallel to each other. We have found that superior results are obtained when the wheels (35) are rotated and aligned such that the faces (71) of the wheels (35) are substantially parallel to the glass ribbon in the edge zones (53) and (55). This alignment can be performed prior to bringing the wheels (35) into close proximity or contact with the glass ribbon as described above, for example.

The guidance device can be positioned such that the wheels (35) of the edge-guidance device impose a horizontal tension or stretching of the glass ribbon. This can be accomplished by rotating the rails (67) and (69) around a centrally located ball joint (centrally located in the rail) in the plane of the glass ribbon such that the top wheel of the edge-guiding assembly is located closer to the center (57) of the glass ribbon (13) than bottom wheel of the edge-guiding assembly.

Although specific embodiments of the invention have been described and illustrated, it is to be understood that modifications can be made without departing from the invention's spirit and scope.

For example, the invention can be used in the manufacture of any type of glass used in displays or in other applications where thin glass sheets are beneficial. As representative examples, the glass may be Corning Incorporated's Code 1737 or Code Eagle XG glass, or glasses for display applications produced by other manufacturers.

A variety of other variations and modifications which do not depart from the scope and spirit of the invention will be evident to persons of ordinary skill in the art from the disclosure herein. The following claims are intended to cover the specific embodiments set forth herein as well as such variations, modifications, and equivalents.

We claim:

1. A method for making a sheet of glass by a vertical drawing process comprising:
    a. forming a glass ribbon using a forming assembly, said ribbon having a central region and two edge regions, each of which has a first side and a second side;
    b. successively removing sheets of glass from the glass ribbon using a separating assembly; and
    c. guiding both the first and the second side of each of the ribbon's edge regions with an edge guiding assembly, the edge guiding assembly being located below the forming assembly and above the separating assembly at a location below that at which the glass of the glass ribbon has passed through its glass transition temperature range;

wherein:
    (i) the edge guiding assembly contacts the edge regions of the glass ribbon;
    (ii) in addition to the edge guiding assembly, one or more pulling rolls contact the edge regions of the glass ribbon; and
    (iii) a population of 50 sequential sheets of the successively removed sheets of glass have a lower standard deviation in stress values in at least one location as compared to a population of 50 sequential sheets produced under the same conditions but without the edge guiding assembly.

2. The method of claim 1 wherein the edge guiding assembly reduces the horizontal motion of the glass ribbon.

3. The method of claim 1 wherein the edge guiding assembly reduces the horizontal motion of the glass ribbon in a region of the glass ribbon which is located between the edge guiding assembly and the forming assembly and which has a temperature within the glass ribbon's glass transition temperature range.

4. The method of claim 1 wherein the edge guiding assembly comprises at least first, second, third and fourth pairs of opposing wheels, the first and second of which guide one of the edge regions of the glass ribbon and the third and fourth pairs of which guide the other edge region of the glass ribbon.

5. The method of claim 4 wherein the wheels on one side of the glass ribbon are brought into close proximity to the ribbon prior to bringing the wheels on the other side of the glass ribbon into close proximity to the ribbon.

6. The method of claim 4 wherein a glass engaging surface of each wheel is brought into contact with the glass ribbon.

7. The method of claim 6 wherein when viewed in plan view, the edge regions of the glass ribbon do not lie along the same line and/or are not parallel to each other and the glass engaging surface of each wheel is angled such that the glass engaging surface of each wheel is aligned to the edge region of the glass ribbon which the wheel guides.

8. The method of claim 6 wherein the glass engaging surface of each wheel is angled such that a horizontal tension is applied to the glass ribbon.

9. The method of claim 1 wherein the edge guiding assembly comprises a plurality of sets of wheels having glass engaging surfaces that are aligned one above the other in a substantially vertical plane.

10. The method of claim 1 wherein the reduction in the standard deviation in stress values is about 40%.

\* \* \* \* \*

UNITED STATES PATENT AND TRADEMARK OFFICE
CERTIFICATE OF CORRECTION

| | | |
|---|---|---|
| PATENT NO. | : 9,212,079 B2 | Page 1 of 1 |
| APPLICATION NO. | : 12/306095 | |
| DATED | : December 15, 2015 | |
| INVENTOR(S) | : Thomas Edward Kirby et al. | |

It is certified that error appears in the above-identified patent and that said Letters Patent is hereby corrected as shown below:

ON THE TITLE PAGE

Inventor Name Appears as: Paor, Liam Ruan de
Inventor Name Correction: de Paor, Liam Ruan Signed and Sealed this
First Day of March, 2016

Michelle K. Lee
*Director of the United States Patent and Trademark Office*